(No Model.)

W. C. MURPHY.
WAGON.

No. 446,562. Patented Feb. 17, 1891.

Witnesses.
Wm. H. Preston
C. H. Daniels

Inventor.
William C. Murphy
by S. N. Piper, atty.

UNITED STATES PATENT OFFICE.

WILLIAM C. MURPHY, OF SALEM, MASSACHUSETTS.

WAGON.

SPECIFICATION forming part of Letters Patent No. 446,562, dated February 17, 1891.

Application filed September 25, 1890. Serial No. 366,058. (No model.)

*To all whom it may concern:*

Be it known that I, WILLIAM C. MURPHY, a citizen of Great Britain, residing at Salem, in the county of Essex and State of Massachusetts, have invented certain new and useful Improvements in Wagons, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

The nature of my invention is defined in the claims hereinafter presented.

Figure 1:
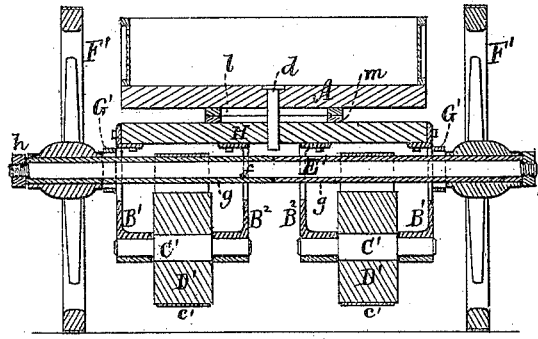
Figure 2:
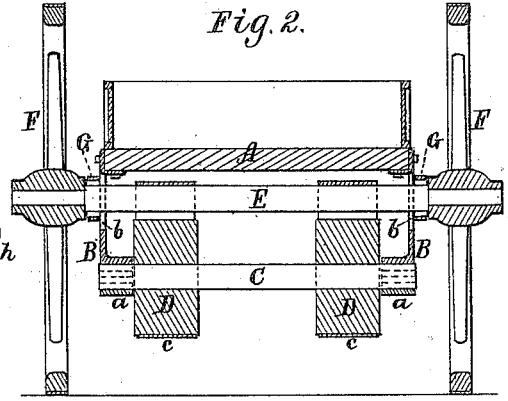
Figure 3:
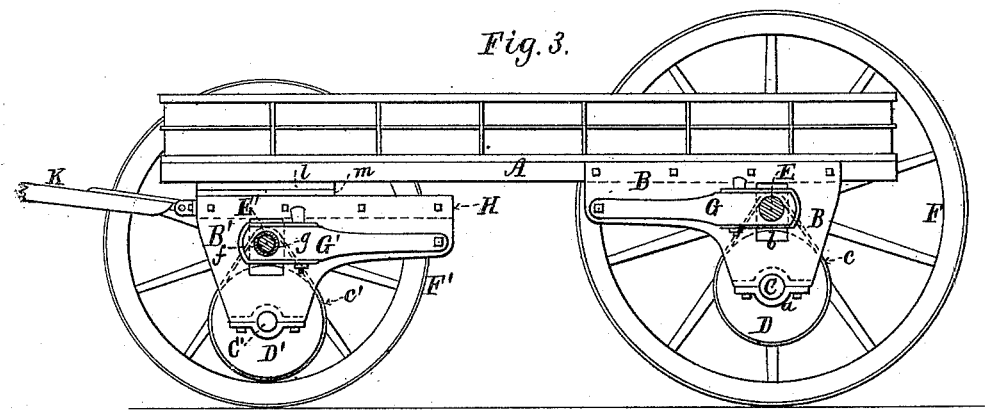
Figure 4:
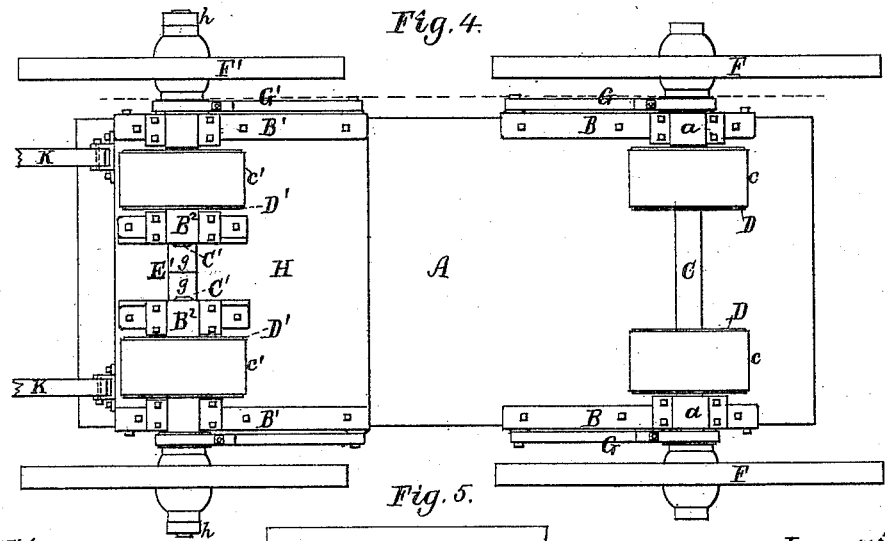
Figure 5:
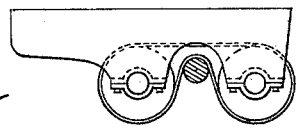

Figure 1 is a vertical section taken longitudinally through the front axle of the wagon. Fig. 2 is a vertical section taken longitudinally through the rear axle of the same. Fig. 3 is a sectional side elevation taken in the plane of line 1 1 of Fig. 4. Fig. 4 is an under side view of said wagon. Fig. 5 represents a modification.

In carrying out my invention I secure to the sides of the body A of the wagon and near to its rear end two hangers B B, each hanger being supplied with a bearing $a$, in which a shaft C is supported. Pulleys or drums D D, arranged between the hangers, are keyed to said shaft C, so as to revolve therewith. Arranged directly over the shaft C is the rear axle E of the carriage, the wheels F F being fixed to said rear axle so as to turn with it. The axle E extends through slots $b\ b$ in the rear hangers, as shown, and bands $c\ c$ pass over and in contact with the periphery of said axle and the drums D D. Connecting-rods G G, pivoted at one end to said hangers and at their other ends to the axle E and next to the hubs of the wheels F, serve to maintain said axle in position. Pivoted to and underneath the body A, near to its forward end, by the bolt or pin $d$, is a platform H, to which are fixed hangers B' B', of the same construction as those fixed to the rear portion of the body. Other hangers B² are also fixed to said platform, which, with the hangers B', sustain short shafts C' C', each provided with a drum or pulley D'.

The forward axle E' extends through slots in the hangers B' and B², is arranged directly over the said shafts C', and consists of a shaft $f$ and two sleeves $g\ g$, adapted to turn on said shafts $f$, one of the forward wheels F' being fixed to each sleeve $g$. Nuts $h\ h$ are screwed on the ends of the shaft $f$ and maintain the sleeves $g$ in position thereon, said sleeves each being capable of turning on the shaft $f$ independently of the other sleeve. By this construction of the forward axle each wheel F', with its sleeve $g$, can turn on the shafts $f$ independently of the other wheel F' and its sleeve $g$, and the platform and the parts attached to it can swivel on the bolt $d$, the body A and said platform H being provided with friction-rings $l\ m$, respectively, to take the wear. The wagon-wheels F F are thus permitted to turn independently of each other, as is necessary when the wagon is moving around a curve. When, however, the wagon is moving in a straight line, the sleeves and axle will revolve together by the friction of the one upon the other.

Bands $c'\ c'$ pass over and in contact with the periphery of the sleeves $g$ and that of the pulleys D', and connecting-rods G', pivoted to the hangers B' and the forward axle, as shown, maintain said axle in position with relation to its supports in the same manner that the rear axle is kept in position, as before mentioned.

The thills K of the vehicle are attached to the platform H in the usual manner that the thills are ordinarily connected to the forward axle of a wagon.

In some cases, instead of placing the shaft C directly under the axle, as shown in Fig. 3, I make use of two shafts and arrange them with relation to the axle as shown in Fig. 5, the band under this arrangement being applied to the axle and to the drums on said shaft in manner as represented in said Fig. 5.

It will be perceived that the weight of the load in the wagon-body is transmitted to the axles E E' through the hangers B B' B², platform H, shafts C C', drums D D', and belts or bands $c\ c'$, and the greater the said weight the greater will be the force of traction of the said bands on the said axles.

By making the slots $b$ in the hangers of a suitable width to receive the axles and allow of the proper play therein the connecting-rods G may be dispensed with, if desired.

What I claim is—

1. In a wagon, the combination of the axle E', composed of a shaft $f$ and two sleeves $g$, adapted to turn on said shaft, the wheels F', fixed to said sleeves, the shafts C', having drums or pulleys fixed or keyed thereto and supported in bearings in depending hangers, and the bands for transmitting motion from the sleeves of the axle to the pulleys D' and shafts C', substantially as and for the purpose described.

2. A wagon provided with hangers, the shafts C C', supported therein and provided with pulleys D D', respectively, the axles E E', and the wagon-wheels fixed to said axles, as described, the bands $c\ c'$ for transmitting motion from said axles to the shafts, and the connecting-rods G G' and the platform H, adapted to swivel with relation to the body, substantially as set forth.

In testimony whereof I affix my signature in presence of two witnesses.

WILLIAM C. MURPHY.

Witnesses:
S. N. PIPER,
S. W. HANNET.